J. J. BORKE.
FOLDING BOW FOR VEHICLE TOPS.
APPLICATION FILED NOV. 25, 1916.
1,235,874.
Patented Aug. 7, 1917.
2 SHEETS—SHEET 1.
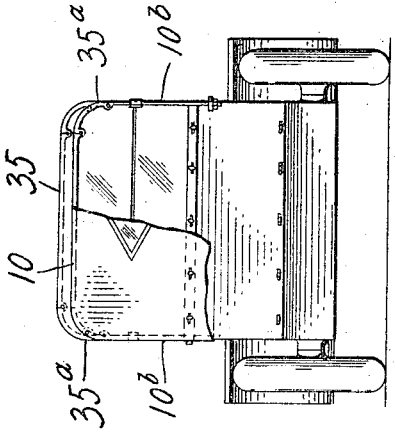
Fig. 3
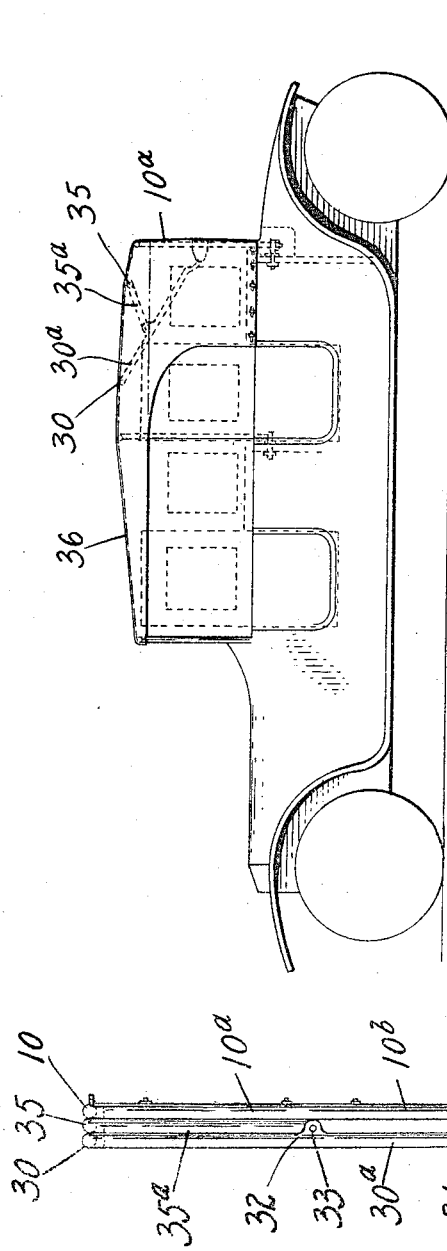
Fig. 1
Fig. 2
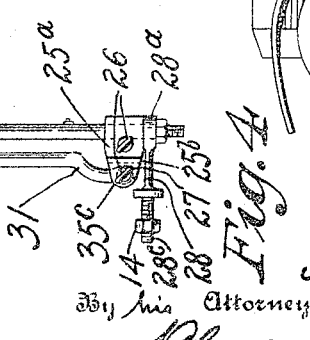
Fig. 4
Inventor
JOHN J. BORKE
By his Attorney
Alexander Innes

J. J. BORKE.
FOLDING BOW FOR VEHICLE TOPS.
APPLICATION FILED NOV. 25, 1916.

1,235,874.

Patented Aug. 7, 1917.
2 SHEETS—SHEET 2.

Inventor
JOHN J. BORKE
By his Attorney
Alexander Innes

UNITED STATES PATENT OFFICE.

JOHN J. BORKE, OF NEW YORK, N. Y.

FOLDING BOW FOR VEHICLE-TOPS.

1,235,874.  Specification of Letters Patent.  Patented Aug. 7, 1917.

Application filed November 25, 1916. Serial No. 133,386.

*To all whom it may concern:*

Be it known that I, JOHN J. BORKE, a citizen of the United States, residing at New York, in the county of New York and State of New York, have invented new and useful Improvements in Folding Bows for Vehicle-Tops, of which the following is a specification.

This invention relates to vehicle tops, the invention being more particularly related to a vehicle top of the extensible, removable and foldable type.

A main object of this invention is to provide a device which is extensible horizontally and vertically, which can be readily attached and readily removed, and which, when removed, is adapted to be adjusted and folded up so as to occupy but comparatively small space.

Another object is to provide a simply constructed and a comparatively inexpensive device of the character indicated, that is adapted to be located in various places on the same vehicle and that is adapted to be employed with equal facility on various types of motor vehicles.

These and other objects which will become manifest as the description advances, are obtained by the novel construction, arrangement and combination of parts hereinafter described and shown in the accompanying drawings, forming a material part of this disclosure, and in which:—

Figure 1 is a side elevation, showing my top applied to a two-seated motor vehicle.

Fig. 2 is a similar view, showing my top applied to a runabout.

Fig. 3 is a rear elevation showing my top applied to a motor vehicle, the covering being partly broken away.

Fig. 4 is a side elevation, the bows being partly folded.

Fig. 5 is a rear elevation of a bow detached, showing the same completely folded.

Fig. 6 is a rear elevation of the bows detached with the covering removed.

Fig. 7 is a section of a bow, taken on the line 6—6 of Fig. 5, and illustrating in particular the arrangement employed to provide for the extension of the bow.

Fig. 8 is a detail perspective view, illustrating the construction and arrangement of the joints for the bows, and Fig. 9 is a perspective view, illustrating a permanent joint.

With more particular reference to the drawings, 10 indicates a top portion of a bow, which is constructed preferably with a hinge or toggle-joint 15 15 at each end, to which are secured corresponding side-arms, each having an inward bend 11 11, upper arm portions $10^a$ $10^a$, joints 16 16, and lower arm portions $10^b$ $10^b$ which terminate with collars 12 12 and the threaded ends 13 13.

In order to make the tops and the side-arms extensible lengthwise in the same manner, each one is composed of pieces which have their adjacent ends flattened on one side so as to slidably overlap each other, and to be secured together in the desired overlapped position. As shown in Fig. 7, for instance, the top portion 10 is composed of parts as $10^{a\prime}$ and $10^{b\prime}$, the ends of which are flat on their inner sides to enable them to be secured in such overlapped position as may be necessary to provide the width of top required to meet the type of car on which the improved top is to be employed. The overlapping portions of the parts as $10^{a\prime}$ are provided therethrough at each end with a longitudinal recess as $10^c$ whereby to receive a headed screw 17 which is threaded on one end for the reception of a threaded wing-nut 18. Thus each of the end pieces are secured together at each end, it being observed that the ends of the pieces which comprise the ends of the parts are not flattened in this manner, but are prepared as required for suitable connection with the adjacent part. Preferably, the side-arms of the bows are also made extensible in a similar manner; and each side-arm is provided with an in-curved portion 11 which serves to assist in giving a rounded shape to the top and to provide for the fold of the side-arms inwardly upon the top one upon the other, as is best shown in Fig. 6. The side-arms are also preferably provided with hinges as 16 which are so arranged so as to enable the lower portions $10^b$ to be folded back upon the upper portions $10^a$ in a plane at right angles to the plane of the fold at the joints 15. Thus the parts of a bow 10 are adjustable lengthwise, and, in addition, the side-arms thereof are foldable inwardly upon themselves and also outwardly upon themselves, so that they can be made to occupy but comparatively small space, thereby enabling them to be placed under the seat of a motor vehicle or in some other convenient place, when not in service.

In applying the bow 10 to a motor vehicle, the ends 13—13 of the lower arms are inserted through eyes 28ª 28ª of arms 28 28, the remote ends 28ᶜ 28ᶜ being secured to the vehicle body. When thus entered in eyes 28ª 28ª, the clamping nuts as 14 14 are applied.

To provide for the adjustable support of auxiliary bows, I employ on each side-arm an adjustable bracket as 25, which is composed of two parts as 25ª, each part having a suitable aperture for the reception of a clamping bolt 26 whereby to adjustably clamp these parts together on the side-arm at the elevation desired. It will be noted here that each bracket 25 has an opening 25ᶜ which is designed to provide clearance for the bolts 17 and the joints 16 when the bracket is to be adjusted vertically. The forward ends of brackets as 25 are provided with apertured lugs as 25ᵇ for the reception of the respective ends of main auxiliary arms 30ª 30ª, the ends of the latter arms being provided for this purpose with an outward bend as 31 31 and being suitably apertured for the reception of the clamping nuts 27 27.

The main auxiliary bow is constructed like the main bow in that it is composed of a similar extensible top 30, to which are hinged, by the toggle joints 15 15, the side arms 30ª 30ª. These arms are preferably constructed with lugs 33 33 which confront the main bow 10. Secured to these lugs as at 32 32 are the side arms 35ª 35ª of another auxiliary bow 35, which, with the exception of the length of the arms 35ª 35ª, is similar in construction in all respects to the other bows.

As shown in Figs. 1, 2 and 3, the complete bow 35 is adapted to be inclined rearwardly toward the complete main bow 10 when the complete bow 30 is inclined away from complete main bow 10. The lower arm of the main bow may be secured to the body of practically any type of motor vehicle at practically any place desired, it being necessary of course, for the purpose, to provide the vehicle at the points of securement with supporting brackets as 28 28. For instance, the main bow may be secured at the rear of the second seat of a touring car or at the rear of a runabout, so that the auxiliary bows extend over the seat, as illustrated in Figs. 1 and 2. Or the main bow may be secured at the rear of the front seat with the auxiliary bow projecting over the same. Or again the main bow may be applied on both the rear and front seats with the auxiliary bows projecting over each of them. Or, furthermore, the main bow, when it is desired, may be secured at the end of the hood in front of the steering gear so as to project over the seat. For use on vehicles on which a detachable top is not desired, I construct the arms of the main bow with integral lugs as 40 40 which are suitably apertured to receive the ends of the arms of the main auxiliary bows, which ends are constructed, for the purpose, inbent at an angle as shown in Fig. 9.

Now each of the bows is provided on its outside surface with the usual interspaced fasteners or buttons as 20, each of which is provided with a lug as 19, which is designed to be engaged by the customary eyes provided for the purpose in the top coverings and in other inclosing curtains. As a means of providing a basis for the support of the coverings and curtains on the bows, I prefer to employ straps as 36 or other appropriate means. These straps are fastened or buttoned to the securing means as 19 on each bow thereby sustaining the auxiliary bows 30 and 35 in proper position against displacement with respect to the main bow 10. The straps may, if desired, be of sufficient length not only to connect the auxiliary bows with the main bow, but also to connect the auxiliary bows with the wind shield frame, appropriate buttons or fastening means being provided thereon to receive them. The top covering is then stretched over the straps and buttoned in position in the customary way.

For runabouts, and in some instances for larger cars, I find that it is unnecessary to provide straps beyond the end of the auxiliary bow 30, inasmuch as the covering can readily be supported between the same and the wind shield by mere tension. A special covering may be provided for my bows which is adapted to be folded up with them, and which is also adapted, when the bows are extended, to be buttoned onto the side curtains in the customary way.

To apply my improved top, it is only necessary to provide the vehicle with the necessary supporting brackets as 28 28, and to secure therein the ends of the main bow. The brackets 25 25 are then elevated to the height desired and the auxiliary bow pivotally secured thereto by the clamping nuts 27, the straps being buttoned in such position as to support the auxiliary bow 30 at the height desired. As the bows are all made of light material, my complete top is comparatively light, so that it may be readily mounted in place as a unit. When it is desired to fold up the bows, in order to carry them in an approximately small space, the main bow 10 is disconnected from the auxiliary bow 30, and each is folded up separately as already described.

While in the foregoing description and in the accompanying drawings, I have shown certain features and a distinct manner of the bows, it will be understood that in practice changes and alterations in these matters may be advantageous, to which changes and alterations I am entitled, provided they are within the scope of the appended claims.

Having thus described my invention, what I claim is:—

1. In a vehicle top, a set of bows each having side-arms hinged to an intermediate portion and foldable inwardly thereupon one upon the other, a projecting bracket adjustably secured to each side arm of one bow, means of pivoting the ends of a second bow to the ends of the brackets at a distance from the first bow, and means on the second bow for pivoting the remaining bows to the second bow so that they may incline toward the first bow when the second bow is inclined away from the same.

2. In a vehicle top, a set of bows each provided with side-arms inturned at one end and constructed of parts adjustable lengthwise one upon the other, a top for each pair of side-arms and constructed of parts adjustable lengthwise one upon the other, a toggle-joint connection between the incurved end of each side-arm and top to enable the side-arms to fold inwardly upon the top one upon the other, a projecting bracket slidably secured to each side-arm of one bow, means of pivoting the free ends of a second bow to the remote ends of the brackets, and means of pivoting the free ends of a third bow to the side-arms of the second bow whereby when the second bow is inclined away from the first bow the third will be inclined toward it.

3. In a vehicle top, a pair of bows each having side-arms hinged to an intermediate portion and foldable inwardly thereupon one upon the other, a projecting bracket slidably secured to each side-arm of one bow, means of pivoting the remaining ends of the other bow to the ends of the brackets, and bow means pivoted to the side-arms of the second bow so as to be inclined toward the first bow when the second bow is inclined in the opposite direction.

4. In a vehicle top, a pair of bows each having extensible side-arms hinged to an extensible intermediate portion and foldable thereupon one upon the other, a projecting bracket secured at right angles to each side-arm of one bow, means of pivoting the remaining arms of the other bow to the remaining ends of the brackets, lugs constructed on the second bow side-arms intermediate their lengths and confronting the first bow, a third bow pivoted to said lugs and adapted to be inclined toward the first bow when the second bow is inclined away from the same, and means for connecting the intermediate top portions of the several bows in order to hold them in position against displacement.

5. In a vehicle top, a set of bows including a main bow each having a lengthwise adjustable top, and each having lengthwise adjustable side-arms hinged to the top and foldable inwardly thereupon one upon the other, a joint in each side-arm of the main bow intermediate its length to provide for the lateral folding of one portion of each side-arm upon the other, a projecting bracket slidably secured to each side-arm of the main bow, means for pivoting the free ends of second bow to the ends of the brackets, and means for pivoting the ends of another bow to the arms of the second bow so that the latter may incline toward the first bow when the second bow is inclined in the opposite direction.

6. In a vehicle top, a main bow, a secondary bow and an auxiliary bow each having a pair of side-arms incurved at their top ends and hinged thereat to opposite ends of an extensible intermediate portion so as to be foldable inwardly upon the latter one upon the other, an outstanding bracket secured similarly at right-angles to each arm of the main bow and adjustable thereon, means for pivoting the free arms of the secondary bow to the free ends of the brackets, lugs carried on the secondary bow and confronting the main bow, means for pivoting the auxiliary bow to said lugs whereby the latter may incline toward the main bow when the secondary bow is inclined in the opposite direction, interspaced fasteners on the outside surface of the bows, and means for connecting the fasteners of the main bows with the fasteners of the other bows in order to hold the bows in position against displacement.

In testimony whereof I have signed my name to this specification.

JOHN J. BORKE.

Copies of this patent may be obtained for five cents each, by addressing the "Commissioner of Patents, Washington, D. C."